United States Patent [19]

Kawamura et al.

[11] Patent Number: 4,775,711

[45] Date of Patent: Oct. 4, 1988

[54] MOLDING ELASTOMERIC COMPOSITION

[75] Inventors: Takanobu Kawamura; Tamihiro Oohashi; Shinji Chiku, all of Ichiharashi, Japan

[73] Assignee: Chisso Corporation, Osaka, Japan

[21] Appl. No.: 33,240

[22] Filed: Apr. 2, 1987

[30] Foreign Application Priority Data

Apr. 14, 1986 [JP] Japan .................................. 61-85297
May 9, 1986 [JP] Japan ................................ 61-106324

[51] Int. Cl.⁴ ...................... C08L 53/00; C08L 53/02; C08L 23/16
[52] U.S. Cl. ..................... 524/232; 525/89; 525/98
[58] Field of Search ..................... 525/98, 89; 524/232

[56] References Cited

U.S. PATENT DOCUMENTS

| | | | |
|---|---|---|---|
| 3,299,174 | 1/1967 | Kuhre et al. ......................... | 260/876 |
| 3,689,595 | 9/1972 | Gwinn .................................. | 525/89 |
| 4,211,690 | 7/1980 | Asano et al. ......................... | 525/89 |
| 4,252,914 | 2/1981 | Halasa et al. ......................... | 525/98 |
| 4,371,662 | 2/1983 | Tone et al. ........................... | 525/89 |
| 4,386,125 | 5/1983 | Shiraki et al. ........................ | 525/89 |

FOREIGN PATENT DOCUMENTS 168203A 1/1986 Japan ..................................... 525/89

Primary Examiner—Carman J. Seccuro
Attorney, Agent, or Firm—Leydig, Voit & Mayer

[57] ABSTRACT

A molding elastomeric composition having superior flexibility, high-impact properties, high mechanical strengths (particularly, flexural modulus), good moldability (particularly, mold-release characteristics) and appearance of the resulting molded products is provided, the composition being obtained (a) by blending a specified proportion of a specified hydrogenated styrene-butadiene-styrene block copolymer having a specified solution viscosity, with a propylene copolymer of a propylene-ethylene block copolymer (I) with a crystalline propylene-ethylene random copolymer (II) in a specified blending ratio; or (b) by blending the specified proportion of the hydrogenated material and a specified proportion of a non-crystalline ethylene-α-olefin random copolymer with the propylene copolymer of (I) with (II); or (c) by blending a specified proportion of the propylene copolymer of (I) with (II), a specified proportion of the hydrogenated material, a specified proportion of the non-crystalline ethylene-α-olefin random copolymer and a specified proportion of a higher fatty acid amide.

6 Claims, No Drawings

MOLDING ELASTOMERIC COMPOSITION

BACKGROUND OF THE INVENTION

1. Field of the Invention

This invention relates to a molding elastomeric composition. More particularly it relates to a molding thermoplastic elastomeric composition having superior flexibility, high-impact properties, mechanical strength (particularly, flexural modulus), moldability (particularly, mold-release characteristics) and appearance of the resulting molded products.

2. Description of the Related Art

Heretofore as polyolefin thermoplastic elastomers, there have been known blends of propylene polymers with non-crystalline ethylene-α-olefin random copolymers or with hydrogenated products of styrene-butadiene-styrene block copolymers (see Official gazette of Japanese patent application laid-open Nos. Sho 50-14742/1975, Sho 52-65551/1977, Sho 58-20664/1983, Sho 58-215446/1983, etc.).

However, elastomeric compositions obtained by blending propylene polymers with hydrogenated products of styrene-butadiene-styrene block copolymers and further hydrocarbon oils for improving the flowability thereof have a drawback that when molded, the mechanical strength (tensile strength and flexural modulus) of the resulting molded products is lower. Further, elastomeric compositions obtained by blending propylene polymers with non-crystalline ethylene-α-olefin random copolymers have a good rubber elasticity, but on the other hand, they have a drawback that when the compositions are molded, the mold-release characteristics of the resulting molded products are inferior and particularly when the quantity of the ethylene-α-olefin random copolymers added is large, the resulting molded products have no mold-release characteristics.

Further, an official gazette of Japanese patent application laid-open No. Sho 61-14248/1986 discloses an elastomeric composition obtained by blending propylene-ethylene block copolymers with hydrogenated materials of styrene-butadiene-styrene block copolymers and if necessary, non-crystalline ethylene-propylene rubbers. However, the above elastomeric composition has a drawback that when molded, flow marks appear on the surface of the resulting molded product, and the problem of such an inferior appearance has not yet been solved.

Still further, elastomeric compositions obtained by blending propylene homopolymer with the above-mentioned hydrogenated products of styrene-butadiene-styrene block copolymers and if necessary, non-crystalline ethylene-propylene rubbers have drawbacks that elastomeric compositions having a good elasticity cannot be obtained and the high-impact properties at low temperatures thereof are insufficient. Further, elastomeric compositions obtained by replacing the above-mentioned propylene homopolymer by propylene-ethylene random copolymers, when molded, afford molded products having superior mechanical strength, high-impact properties and appearance, but sink marks or fins are liable to appear on the surface of the molded products so that a problem relative to molding (particularly, mold-release characteristics) has been raised.

The present inventors have made extensive research in order to solve the above-mentioned problems directed to the polypropylene elastomeric compositions, and as a result, have found that the following compositions can solve the above-mentioned problems:

a composition obtained by blending a propylene-ethylene block copolymer (I) with a specified crystalline propylene-ethylene random copolymer (II) within a specified range of ratio and further blending with the resulting propylene copolymer, a specified quantity of a specified hydrogenated styrene-butadiene-styrene block copolymer;

a composition obtained by further blending with the above-mentioned composition, a specified quantity of a non-crystalline ethylene-α-olefin random copolymer; and a composition obtained by blending a propylene-ethylene block copolymer (I) with a crystalline propylene-ethylene random copolymer (II) having a specified flexural modulus within a specified range of ratio and further blending with a specified quantity of the resulting propylene copolymer, a specified hydrogenated styrene-butadiene-styrene block copolymer, a non-crystalline ethylene-α-olefin random copolymer and a higher fatty acid amide, in specified quantities, respectively.

SUMMARY OF THE INVENTION

As apparent from the foregoing, the object of the present invention is to provide a molding propylene elastomeric composition having superior flexibility, high-impact properties, high mechanical strength, moldability (particularly mold-release characteristics), good appearance (no flow mark, sink mark and fin) and anti-blocking.

The present invention resides in the following constitutions:

(1) A molding elastomeric composition obtained by blending 10 to 50% by weight of a hydrogenated styrene-butadiene-styrene block copolymer having a solution viscosity of 300 to 800 cps as measured in a 20% by weight toluene solution at 25° C., with a propylene copolymer of a propylene-ethylene block copolymer (I) with a crystalline propylene-ethylene random copolymer (II) in a blending ratio by weight of (I)/(II) of 8/2 to 2/8, the total % by weight of said hydrogenated styrene-butadiene-styrene block copolymer and said propylene copolymer being 100% by weight.

(2) A molding elastomeric composition obtained by blending 10 to 50% by weight of a hydrogenated styrene-butadiene-styrene block copolymer having a solution viscosity of 300 to 800 cps as measured in a 20% by weight toluene solution at 25° C. and 1 to 30% by weight of a non-crystalline ethylene-α-olefin random copolymer, with a propylene copolymer of a propylene-ethylene block copolymer (I) with a crystalline propylene-ethylene random copolymer (II) in a blending ratio by weight of (I)/(II) of 8/2 to 2/8, the total % by weight of said hydrogenated styrene-butadiene-styrene block copolymer, said propylene copolymer and said non-crystalline ethylene-α-olefin random copolymer being 100% by weight.

(3) A molding elastomeric composition comprising
(a) 50 to 70% by weight of a propylene copolymer of a propylene-ethylene block copolymer (I) with a crystalline propylene-ethylene random copolymer (II) in a blending ratio by weight of (I)/(II) of 8/2 to 2/8,
(b) 10 to 45% by weight of a hydrogenated styrene-butadiene-styrene block copolymer,
(c) 1 to 30% by weight of a non-crystalline ethylene-α-olefin random copolymer, and (d) 0.01 to 5 parts by weight of a higher fatty acid amide based on 100 parts by weight in total of the (a), (b) and (c).

DETAILED DESCRIPTION OF PREFERRED EMBODIMENTS

The propylene-ethylene block copolymer (I) and crystalline propylene-ethylene random copolymer (II) used in the present invention refer to those having a melt flow rate (MFR) (the quantity of molten resin extruded over 10 minutes under a load of 2.16 Kg at 230° C.) of 1 to 100 g/10 minutes, preferably 10 to 60 g/10 minutes.

If those having a MFR less than 1 g/10 minutes are used, the melt-flowability of the composition is inferior so that for example, it may often be difficult to mold the composition into large-size molded products such as bumpers for automobiles, while if the MFR exceeds 100 g/10 minutes, the high-impact properties of the resulting molded products are lower. Further, as to the crystalline propylene-ethylene random copolymer (II), it is necessary to use those having as its specific feature, a flexural modulus of 3,000 to 9,000 Kgf/cm$^2$ as measured according to JIS K 6758, and those having 5,000 to 8,000 Kgf/cm$^2$ are particularly preferred. Further, the crystalline propylene-ethylene random copolymer (II) also includes a crystalline propylene-ethylene-butene random terpolymer having a flexural modulus of 3,000 to 9,000 Kgf/cm$^2$.

If those having a flexural modulus exceeding 9,000 Kgf/cm$^2$ are used, it is impossible to obtain an elastomeric composition having a superior flexibility, while if those having a flexural modulus less than 3,000 Kgf/cm$^2$ are used, the mechanical strength (tensile strength and flexural modulus) of the resulting molded product may be lower and also the mold-release characteristics at the time of molding may be inferior.

Further, the blending ratio by weight of the propylene-ethylene block copolymer (I) to the crystalline propylene-ethylene random copolymer (II) is necessary to be within a range of 8/2 to 2/8. If the blending ratio exceeds 8/2, flow marks are observed on the surface of the resulting molded product, that is, its appearance is inferior, while if it is less than 2/8, sink marks and fins are observed on the surface of the resulting molded product, that is, its appearance is inferior.

Further, the blending proportion of the propylene copolymer consisting of a mixture of the propylene-ethylene block copolymer (I) with the crystalline propylene-ethylene random copolymer (II) and used in the present invention is in the range of 50 to 70% by weight, preferably 55 to 65% by weight.

If the blending proportion is less than 50% by weight, the molded product prepared from the resulting composition may have an inferior surface appearance (occurrence of flow marks), while if it exceeds 70% by weight, the high-impact properties at low temperatures of the resulting molded product are lower.

An example of the hydrogenated styrene-butadiene-styrene block copolymer used in the present invention is KRAYTON G-1652 (trademark of a product manufactured by Shell Chemical Company), which is a product having 10% by weight or less of the styrene block hydrogenated and having 90% by weight or more of the butadiene block hydrogenated. The hydrogenation process is disclosed in e.g. Japanese patent publication Nos. Sho 42-8704/1967 and Sho 43-6636/1968.

Further, the hydrogenated styrene-butadiene-styrene block copolymer is necessary to have a solution viscosity of 300 to 800 cps as measured in a 20% by weight toluene solution at 25° C. If those having a solution viscosity exceeding 800 cps are blended, they have an inferior compatibility with the propylene copolymer and when molded products are prepared therefrom, flow marks appear on the surface thereof and the flowability of the molten resin at the time of molding is lower.

The blending proportion of the hydrogenated styrene-butadiene-styrene block copolymer is in the range of 10 to 50% by weight, preferably 15 to 40% by weight. If it is less than 10% by weight, the resulting composition has an inferior moldability (particularly mold-release characteristics), while if it exceeds 50% by weight, molded products prepared therefrom are observed to have flow marks on the surface thereof, that is, the appearance is inferior, and also the mechanical strength of the molded products may be notably lower.

As to the non-crystalline ethylene-α-olefin random copolymer used in the present invention, the α-olefin component therein refers to α-olefins of 3 carbon atoms or more, particularly 3 to 18 carbon atoms such as propylene, butene-1, hexene-1, 4-methyl-pentene-1, heptene-1, octene-1, nonene-1, decene-1, etc. Among these, propylene is preferred.

Further, the α-olefin component in the ethylene-α-olefin random copolymer may be used alone or in admixture of two kinds or more.

In addition, a small quantity of a diene component may be contained in the ethylene-α-olefin random copolymer.

Preferred ethylene-α-olefin random copolymers are a non-crystalline ethylene-propylene random copolymer or a non-crystalline ethylene-propylene-diene random copolymer. In the case of the non-crystalline ethylene-propylene random copolymer, the ethylene content is usually in the range of 25 to 75% by weight, preferably 25 to 50% by weight. The blending proportion of the non-crystalline ethylene-α-olefin random copolymer is 1 to 30% by weight. If it exceeds 30% by weight, the moldability, particularly mold-release characteristics, of the resulting composition are inferior.

Examples of the higher fatty acid amide used in the present invention are oleic acid amide, erucic acid amide, stearic acid amide, etc. Among these, oleic acid amide is particularly preferred.

The blending proportion of the higher fatty acid amide is in the range of 0.01 to 5 parts by weight, preferably 0.1 to 2 parts by weight based on 100 parts by weight as the total weight of the propylene copolymer, the hydrogenated styrene-butadiene-styrene block copolymer and the non-crystalline ethylene-α-olefin random copolymer. If the blending proportion is less than 0.01 part by weight, the mold-release characteristics at the time of molding the resulting composition into molded products, and the anti-blocking of the molded products are insufficient, while if the proportion exceeds 5 parts by weight, blooming of the higher fatty acid amide onto the surface of the resulting molded products is notable; hence the products have an inferior appearance.

In the composition of the present invention, if necessary, one kind or more of various additives may be adequately blended in the range in which the effect of the present invention is not hindered. Examples of such additives are antioxidant, antistatic agents coloring agents, organic halogen containing flame-retardants such as decabromodiphenyl oxide, dodecachlorodecahydrodimethanodibenzocyclooctene, etc., adjuvant for flame retardant such as antimony oxide, antimony sulfide, zirconium oxide, etc., ultraviolet absorber, plasticizer, mineral non-aromatic softening agents for rubbers such as extender oil for EPDM, process oil, etc.

As the process for producing the composition of the present invention, the following process may be illustrated:

A propylene copolymer, a hydrogenated styrene-butadiene-styrene block copolymer and one kind or more of the above various additives, each in a specified quantity; or a propylene copolymer, a hydrogenated styrene-butadiene-styrene block copolymer, a non-crystalline ethylene-α-olefin random copolymer and one kind or more of the above various additives, each in a specified quantity; or a propylene copolymer, a hydrogenated styrene-butadiene-styrene block copolymer, a non-crystalline ethylene-α-olefin random copolymer, a higher fatty acid amide and one kind or more of the above various additives, each in a specified quantity, are mixed with stirring by means of ribbon blender, tumbler mixer, Henschel (trademark) mixer, super mixer, etc., followed by melt-kneading the mixture by means of rolls, Banbury mixer (tradename), extruder or the like at a melt-kneading temperature of 150° to 300° C., preferably 180° to 230° C. and pelletizing it.

The thus obtained molding elastomeric composition of the present invention is subjected to various molding processes such as injection molding, extrusion molding, vacuum forming, air-pressure forming, etc. to obtain various molded products.

Thus the composition of the present invention is a composition having a two-phase structure consisting of a plastic phase and a rubber phase, and hence it is a molding elastomeric composition having superior flexibility, high-impact properties, high mechanical strength, and particularly having superior moldability (particularly mold-release characteristics), and when molded, affording a molded product having a superior anti-blocking and a good appearance, and suitably usable for parts of automobiles such as bumpers, housings for OA apparatus, domestic appliances, wire coating material, footwear such as shoe soles, etc.

The present invention will be concretely described by way of Examples and Comparative examples, but it should not be construed to be limited thereto.

In addition, the blending components used in Examples and Comparative examples and the evaluation methods thereof are as follows:

(1) Propylene-ethylene block copolymer (I):
a propylene-ethylene copolymer manufactured by CHISSO PETROCHEMICAL CORPORATION and having an ethylene content of 12.5% by weight and a melt flow rate of 45 g/10 minutes.

(2) Crystalline propylene-ethylene random copolymer (II):
a crystalline propylene-ethylene-butene random terpolymer manufactured by CHISSO PETROCHEMICAL CORPORATION and having an ethylene content of 4.5% by weight, a butene content of 4.5% by weight, a melt flow rate of 45 g/10 minutes and a flexural modulus of 6,000 Kgf/cm$^2$.

(3) Hydrogenated styrene-butadiene-styrene block copolymer:
KRATON G-1652 and KRATON G-1650, each a tradename of product manufactured by Shell Chemical Company, the former being a hydrogenated styrene-butadiene-styrene block copolymer having a solution viscosity of 550 cps and the latter being that having a solution viscosity of 1,100 cps, each as measured in a 20 % by weight toluene solution at 25° C.

(4) Non-crystalline ethylene-propylene random copolymer:
EP02P (tradename) manufactured by Japan Synthetic Rubber Co., Ltd. and having a Mooney viscosity $M_{1+4}^{100}$ of 24.

(5) Higher fatty acid amide:
Oleic acid amide (Diamid $\overline{O}$-200L (tradename) manufactured by Nihon Kasei Co., Ltd.

Evaluation methods:
(1) Melt flow rate (g/10 minutes):
according to JIS K-6758.
(2) Flexural modulus (Kgf/cm$^2$):
according to JIS K-6758.
(3) Izod impact strength (Kgf.cm/cm):
according to JIS K-7110 (temperature: $-40°$ C., load: 40 Kg).
(4) Appearance of molded product:
Using pellets obtained above, a flat plate of 400 mm (long)×80 mm (wide)×3 mm (thick) was prepared by injection molding under molding conditions of a molding temperature of 230° C., an injection pressure of 600 Kgf/cm$^2$, a dwell of 20 Kgf/cm$^2$, a cooling time of 20 seconds and a mold temperature of 30° C., and the surface condition of the resulting flat plate was evaluated by observing it with the naked eye.

The materials having no flow marks, silver streaks, sink marks and fins were considered good.

(5) Moldability (mold-release characteristics):
Using pellets obtained above, a reticulate cage of 200 mm (long)×300 mm (wide)×80 mm (deep) was prepared by injection molding under molding conditions of a molding temperature of 230° C., an injection pressure of 600 Kgf/cm$^2$, a dwell of 20 Kgf/cm$^2$, a cooling time of 20 seconds and a mold temperature of 30° C., and the superiority or inferiority of the mold-release characteristics of the resulting molded product from the cage mold were judged by the naked eye.

(6) Blocking tendency of molded product:
Using pellets obtained above, a flat plate of 150 mm (long)×150 mm (wide)×3 mm (thick) was prepared by injection molding under molding conditions of a molding temperature of 230° C., an injection pressure of 600 Kgf/cm$^2$ and a mold temperature of 30° C. Five plates of the resulting flat plate were placed upon one another, followed by applying a load of 2 Kg onto the resulting material and allowing it to stand for 24 hours. Thereafter the blocking state of the flat plates with one another at the time of the plates being peeled off from one another was observed by the naked eye, and the state was evaluated based on the following standards:

××x: when peeled off, the flat plates broke.
×: blocking occurred.
o: no blocking.

EXAMPLES 1 TO 5 AND COMPARATIVE EXAMPLES 1-5

A propylene-ethylene block copolymer having a MFR of 45 g/10 min. and an ethylene content of 12.5% by weight as the propylene-ethylene block copolymer (I), a crystalline propylene-ethylene-butene random terpolymer having a MFR of 42 g/10 min., an ethylene content of 4.5% by weight, a butene content of 4.5% by weight and a flexural modulus of 6,000 Kgf/cm$^2$ as the crystalline propylene-ethylene random copolymer (II), KRATON G-1652 manufactured by Shell Chemical Company and having a solution viscosity of 550 cps as measured in a 20% by weight toluene solution at 25° C. as the hydrogenated styrene-butadiene-styrene block copolymer and an ethylene-propylene rubber (EP02P (tradename of product manufactured by Japan Synthetic Rubber Co., Ltd.; Mooney viscosity $M_{1+4}^{100}$ =24) as the non-crystalline ethylene-α-olefin random copolymer, were mixed with stirring for 3 minutes in blending proportions described in Table 1 mentioned later with a Henschel (trademark) mixer, followed by melt-kneading and extruding the mixture at a melt-kneading temperature of 200° C. by means of a single-screw extruder having a bore diameter of 40 mm and pelletizing the resulting material.

Further, in Comparative examples 1-5, the same propylene-ethylene block copolymer (I), crystalline propylene-ethylene random copolymer (II) and non-crystalline ethylene-propylene rubber as those used in Examples 1-5 and KRATON G-1650 (trademark of product manufactured by Shell Chemical Company; a solution viscosity of 1,100 cps as measured in a 20% by weight toluene solution at 25° C.) as the hydrogenated styrene-butadiene-styrene block copolymer, were mixed with stirring in blending proportions indica&ed in Table 1, melt-kneaded and pelletized in the same manner as in Examples 1-5.

Using pellets obtained in these Examples and Comparative examples, MFR was measured, and definite test pieces were prepared therefrom by injection molding at a molding temperature of 230° C. and a mold temperature of 30° C., followed by measuring the flexural modulus and Izod impact strength of the resulting molded product. Further, using pellets obtained above, molded products were prepared by injection molding and the appearance thereof was evaluated and also the moldability (mold-release characteristics) was evaluated.

The results are collectively shown in Table 1.

EXAMPLES 6-11 AND COMPARATIVE EXAMPLES 6-11

A propylene-ethylene block copolymer containing dimyristylthiodipropionate (0.1% by weight), tetrakis[-methylene-3-(3,5-di-t-butyl-4-hydroxyphenyl)propionate]methane (0.18% by weight) and calcium stearate (0.03% by weight) and a crystalline propylene-ethylene-butene random terpolymer, KRATON G-1652, a non-crystalline ethylene-propylene random copolymer(EP02P) and oleic acid amide, in definite quantities, were introduced into a Henschel (trademark) mixer in blending proportions indicated in Table 2, followed by mixing these with stirring for 3 minutes, and melt-kneading and pelletizing the mixture at a melt-kneading temperature of 200° C. by means of a single-screw extruder having a bore diameter of 40 mm.

Further, in Comparative examples 6-11, the respective blending components were introduced into a Henschel (trademark) mixer blending proportions indicated in Table 2, followed by mixing with stirring, melt-kneading and extruding and pelletizing the mixture in the same manner as in Examples 6-11.

Using pellets obtained in the respective Examples and Comparative examples, MFR was measured and also test pieces prepared therefrom were subjected to various evaluation tests. These results are collectively shown in Table 2.

TABLE 1

| | Example | | | | | Comparative example | | | | |
|---|---|---|---|---|---|---|---|---|---|---|
| | 1 | 2 | 3 | 4 | 5 | 1 | 2 | 3 | 4 | 5 |
| Crystalline | | | | | | | | | | |
| P.E. random copolymer | 25 | 30 | 25 | 15 | 40 | 55 | — | 25 | — | 25 |
| P.E. block copolymer | 30 | 35 | 30 | 40 | 15 | — | 55 | 30 | 55 | 30 |
| KRATON G-1652 | 30 | 15 | 45 | 30 | 30 | 30 | 30 | — | — | — |
| KRATON G-1650 | — | — | — | — | — | — | — | — | — | 30 |
| Non-crystalline E-P random copolymer | 15 | 20 | — | 15 | 15 | 15 | 15 | 45 | 45 | 15 |
| MFR (g/10 min.) | 10 | 16 | 8 | 10 | 10 | 11 | 10 | 15 | 16 | 8 |
| Flexural modulus (Kgf/cm$^2$) | 2950 | 4200 | 3100 | 3050 | 2930 | 2910 | 3500 | 3300 | 3500 | 3000 |
| Izod (−40° C.) (Kgf·cm) | NB | 20 | NB | NB | NB | 30 | NB | NB | NB | NB |
| Appearance of molded product (flowmark, sink mark, fin) | good | good | good | good | good | sink mark and fin, present | flow mark, present | sink mark and fin, present | sink mark and fin, present | flow mark, present |
| Mold-release characteristics | good | good | good | good | good | good | good | bad | bad | good |

Note:
NB in Table indicates that no breakage occurred.

TABLE 2

| | | Example | | | | | | Comparative example | | | | | |
|---|---|---|---|---|---|---|---|---|---|---|---|---|---|
| | | 6 | 7 | 8 | 9 | 10 | 11 | 6 | 7 | 8 | 9 | 10 | 11 |
| Proportions of blending components | | | | | | | | | | | | | |
| P-E block copolymer (I) | wt. % | 30 | 30 | 30 | 30 | 40 | 15 | 30 | 30 | 55 | — | 30 | — |
| Crystalline P-E random copolymer (II) | " | 25 | 25 | 25 | 25 | 15 | 40 | 25 | 25 | — | 55 | 25 | 55 |
| KRATON G-1652 | " | 25 | 25 | 25 | 40 | 25 | 25 | 25 | — | 25 | 25 | — | — |
| KRATON G-1650 | " | — | — | — | — | — | — | — | 25 | — | — | — | — |

TABLE 2-continued

|  |  | Example | | | | | | Comparative example | | | | | |
| --- | --- | --- | --- | --- | --- | --- | --- | --- | --- | --- | --- | --- | --- |
|  |  | 6 | 7 | 8 | 9 | 10 | 11 | 6 | 7 | 8 | 9 | 10 | 11 |
| Non-crystalline E-P random copolymer | " | 20 | 20 | 20 | 5 | 20 | 20 | 20 | 20 | 20 | 20 | 45 | 45 |
| Oleic acid amide | wt. part | 0.2 | 0.4 | 0.6 | 0.4 | 0.4 | 0.4 | — | — | — | — | — | — |
| MFR | g/10 min. | 15 | 15 | 15 | 12 | 14 | 16 | 14 | 8 | 14 | 16 | 17 | 18 |
| Flexural modulus | Kgf/cm$^2$ | 3000 | 3000 | 3000 | 3100 | 3100 | 2900 | 3000 | 3000 | 3500 | 2800 | 2900 | 2600 |
| Izod impact strength*[1] | Kgf·cm/cm | NB | NB | NB | NB | NB | NB | NB | NB | NB | 30 | NB | 30 |
| Appearance of molded product | — | good | good | good | good | good | good | good | flow mark, present | flow mark, present | Sink mark, & fin present | flow mark, present | Sink mark, & fin present |
| Mold-release characteristics | — | good | good | good | good | good | good | good | good | good | good | bad | bad |
| Blocking of molded product | — | o | o | o | o | o | o | x | x | x | x | xx | xx |

(Note)
*[1]NB in the Izod impact strength values indicates that the test pieces were not broken.

What we claim is:

1. A molding elastomeric composition obtained by blending 10 to 50% by weight of a hydrogenated styrene-butadiene-styrene block copolymer having a solution viscosity of 300 to 800 cps as measured in a 20% by weight toluene solution at 25° C., with a propylene copolymer of a propylene-ethylene block copolymer (I) with a crystalline propylene-ethylene random copolymer (II) having a flexural modulus of 3,000 to 9,000 kgf/cm$^2$ in a blending ratio by weight of (I)/(II) of 8/2 to 2/8, the total % by weight of said hydrogenated styrene-butadiene-styrene block copolymer and said propylene copolymer being 100% by weight.

2. A molding elastomeric composition according to claim 1 wherein said propylene-ethylene block copolymer (I) and said crystalline propylene-ethylene random copolymer (II) each have a melt flow rate of 1 to 100 g/10 minutes.

3. A molding elastomeric composition obtained by blending 10 to 50% by weight of a hydrogenated styrene-butadiene-styrene block copolymer having a solution viscosity of 300 to 800 cps as measured in a 20% by weight toluene solution at 25° C. and 1 to 30% by weight of a non-crystalline ethylene-α-olefin random copolymer, with a propylene copolymer of a propylene-ethylene block copolymer (I) with a crystalline propylene-ethylene random copolymer (II) having a flexural modulus of 3,000 to 9,000 kgf/cm$^2$ in a blending ratio by weight of (I)/(II) of 8/2 to 2/8, the total % by weight of said hydrogenated styrene-butadiene-styrene block copolymer, said propylene copolymer and said non-crystalline ethylene-α-olefin random copolymer being 100% by weight.

4. A molding elastomeric composition according to claim 3 wherein said propylene-ethylene block copolymer (I) and said crystalline propylene-ethylene random copolymer (II) each have a melt flow rate of 1 to 100 g/10 minutes.

5. A molding elastomeric composition comprising
(a) 50 to 70% by weight of a propylene copolymer of a propylene-ethylene block copolymer (I) with a crystalline propylene-ethylene random copolymer (II) having a flexural modulus of 3,000 to 9,000 kgf/cm$^2$ in a blending ratio by weight of (I)/(II) of 8/2 to 2/8,
(b) 10 to 45% by weight of a hydrogenated styrene-butadiene-styrene block copolymer,
(c) 1 to 30% by weight of a non-crystalline ethylene-α-olefin random copolymer, and
(d) 0.01 to 5 parts by weight of a higher fatty acid amide based on 100 parts by weight as the total of the (a), (b) and (c).

6. A molding elastomeric composition according to claim 5 wherein said propylene-ethylene block copolymer (I) and said crystalline propylene-ethylene random copolymer (II) each have a melt flow rate of 1 to 100 g/10 minutes.

* * * * *